(12) United States Patent
Pericleous

(10) Patent No.: US 10,253,757 B2
(45) Date of Patent: Apr. 9, 2019

(54) WIND TURBINE CONTROL SYSTEM WITH BOOST BASED ON UPSTREAM WIND SPEED

(71) Applicant: VESTAS WIND SYSTEMS A/S, Aarhus N (DK)

(72) Inventor: Alex Pericleous, Sutton Coldfield (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 174 days.

(21) Appl. No.: 14/432,734

(22) PCT Filed: Oct. 2, 2012

(86) PCT No.: PCT/DK2012/050369
§ 371 (c)(1),
(2) Date: Mar. 31, 2015

(87) PCT Pub. No.: WO2014/053136
PCT Pub. Date: Apr. 10, 2014

(65) Prior Publication Data
US 2015/0233349 A1  Aug. 20, 2015

(51) Int. Cl.
*G06F 19/00* (2018.01)
*F03D 7/02* (2006.01)
*F03D 7/04* (2006.01)

(52) U.S. Cl.
CPC .......... *F03D 7/028* (2013.01); *F03D 7/0224* (2013.01); *F03D 7/0272* (2013.01); *F03D 7/047* (2013.01);
(Continued)

(58) Field of Classification Search
CPC ...... F03D 7/0224; F03D 7/0272; F03D 7/028; F03D 7/047; F05B 2260/82;
(Continued)

(56) References Cited

U.S. PATENT DOCUMENTS 4,703,189 A * 10/1987 DiValentin ............ F03D 7/0224
290/44
5,155,375 A 10/1992 Holley
(Continued)

FOREIGN PATENT DOCUMENTS

EP 1132614 A2 9/2001
EP 2292928 A2 3/2011

OTHER PUBLICATIONS

International Search Report for PCT/DK2012/050369, dated Jun. 3, 2013.

*Primary Examiner* — Michael D Masinick
(74) *Attorney, Agent, or Firm* — Patterson + Sheridan, LLP

(57) ABSTRACT

The present invention relates to methods, controllers, wind turbines and computer program products for controlling a wind turbine. One or more wind speed measurements upstream of a wind turbine are received 202 and a determination of an indication of a current wind speed at the wind turbine is made 204. The indication may include below rated wind speed or above rated wind speed. It is determined 205 if the wind speed is in an up transition region or a down transition region based on the received one or more wind speed measurements and the indication of said current wind speed. If determined that said wind speed is in an up transition region or a down transition region then a boost action is performed 206.

19 Claims, 6 Drawing Sheets

(52) U.S. Cl.
CPC ..... *F05B 2260/82* (2013.01); *F05B 2260/821* (2013.01); *F05B 2260/8211* (2013.01); *F05B 2270/20* (2013.01); *F05B 2270/32* (2013.01); *F05B 2270/3201* (2013.01); *F05B 2270/335* (2013.01); *Y02E 10/723* (2013.01)

(58) Field of Classification Search
CPC ........ F05B 2260/821; F05B 2260/8211; F05B 2270/20; F05B 2270/32; F05B 2270/3201; F05B 2270/335; Y02E 10/723
See application file for complete search history.

(56) References Cited

U.S. PATENT DOCUMENTS

| | | | |
|---|---|---|---|
| 6,361,275 B1* | 3/2002 | Wobben | F03D 7/0224 |
| | | | 416/31 |
| 9,115,695 B2* | 8/2015 | Bech | F03D 7/0276 |
| 2007/0057517 A1* | 3/2007 | McNerney | F03D 7/0224 |
| | | | 290/44 |
| 2007/0075546 A1* | 4/2007 | Avagliano | F03D 7/0224 |
| | | | 290/44 |
| 2010/0135789 A1 | 6/2010 | Zheng et al. | |
| 2010/0230966 A1* | 9/2010 | Pavlak | F03D 9/002 |
| | | | 290/44 |
| 2013/0106107 A1* | 5/2013 | Spruce | F03D 7/0224 |
| | | | 290/44 |

* cited by examiner

WIND TURBINE CONTROL SYSTEM WITH BOOST BASED ON UPSTREAM WIND SPEED

The present invention relates to wind turbine control and, in particular, to the control of a wind turbine for more efficient and effective production of electrical power.

A wind turbine is a device that generates electrical power from wind energy. In effect the kinetic energy from the wind is converted to electrical power via a generator in the wind turbine.

Typically, it is preferable that a wind turbine is generating the maximum electrical power output as this is the most efficient and cost effective operation of a wind turbine. Therefore, there is a constant need to more efficiently control and operate the wind turbine in order to extend the region in which the maximum electrical power output is generated.

The present invention seeks to address, at least in part, the need to more efficiently control a wind turbine to extend the region in which the maximum electrical power output is generated.

According to a first aspect of the present invention there is provided a method comprising: receiving one or more wind speed measurements upstream of a wind turbine; determining an indication of a current wind speed at the wind turbine wherein the indication includes below rated wind speed or above rated wind speed; determining if wind speed is in an up transition region or a down transition region based on the received one or more wind speed measurements and the indication of the current wind speed; and initiating a boost action if determined that the wind speed is in the up transition region or the down transition region.

Accordingly, the method receives one or more wind speed measurements upstream of the wind turbine. The wind speed measurements may be taken at any suitable distance upstream of the wind turbine, for example, at 50 meters, 100 meters 150 meters, 200 meter and so on. Any suitable device or sensor may be used to obtain or take the wind speed measurements, for example, a Light Detecting and Ranging (LiDAR) device. The device or sensor may be attached to or located at the wind turbine or may be separate to the wind turbine.

An indication of the current wind speed at the wind turbine is determined where the indication may include above rated wind speed or below rated wind speed. It is further determined whether the wind speed is in an up transition region or down transition region based on the indication of the current wind speed at the wind turbine and the received one or more wind speed measurements taken upstream of the wind turbine. If the wind speed is in a transition region then a boost action is initiated. The boost action may be initiated such that additional electrical power may be generated in the transition regions.

Thus, the present invention advantageously enables additional or an increased level of electrical power to be generated than current wind turbines in the transition regions.

The method may be implemented by a controller.

Determining the indication of the current wind speed may further comprise identifying a current electrical power output of a generator of the wind turbine; and wherein the determination of the indication of the current wind speed may be based on the current electrical power output of the generator. Accordingly, the current wind speed in terms of an indication of whether the wind speed is below rated wind speed or above rated wind speed may be determined based on the current electrical power output of the generator. For example, if the wind speed is below rated wind speed then the electrical power output will be below the designed or permissible maximum electrical power output for a given wind turbine. If the wind speed is above rated wind speed then the electrical power output of the generator will be at or substantially close to the maximum designed or permissible electrical power output for the wind turbine. As will be appreciated, each wind turbine may be designed with a different maximum electrical power output. In the present invention the term above rated wind speed may include both the rated wind speed and any wind speed above the rated wind speed.

Determining if the wind speed is in the up transition region may further comprise comparing the received wind speed measurement with the indication of the current wind speed; and wherein the wind speed is in the up transition region if the indication of the wind speed at the wind turbine is below rated and the wind speed measurement is above rated wind speed for the wind turbine. As such, an up transition region is one where the wind speed will be transitioning from below rated wind speed to above rated wind speed.

Determining if the wind speed is in the up transition region further comprises determining if two or more consecutive received wind speed measurements are above rated wind speeds for the wind turbine. Accordingly, in order to prevent the boost action being activated or initiated unnecessarily the method may determine whether two or more consecutive wind speed measurements are above rated wind speeds.

Determining if the wind speed is in the down transition region may further comprise comparing the received wind speed measurement with the indication of the current wind speed; and wherein the wind speed is in the down transition region if the indication of the wind speed at the wind turbine is above rated wind speed for the wind turbine and the wind speed measurement is below rated wind speed for the wind turbine.

Determining if the wind speed is in the down transition region further may further comprise determining if two or more consecutive received wind speed measurements are below rated wind speeds for the wind turbine.

Initiating the boost action may further comprise instructing a generator in the wind turbine to increase electrical torque if the wind speed is in the up transition region. Accordingly, if determined that the wind speed is in an up transition region then the boost action initiated may be to increase the electrical torque of the generator.

This has the advantageous effect of slowing the rotor speed and enabling an increase in the electrical power generated in the up transition region.

Initiating the boost action may further comprise instructing a pitch control system of the wind turbine to alter a pitch angle of one or more turbine blades if the wind speed is in the down transition region. Accordingly, if determined that the wind speed is in a down transition region then the boost action initiated may be to alter or change the pitch angle of one or more turbine blades. This has the advantageous effect of increasing the rotor speed and enabling an increase in the electrical power generated in the down transition region.

Initiating the boost action may further comprise instructing one or more aero dynamical devices or entities on the wind turbine to alter or change in order to increase the rotor speed in the down transition region.

According to a second aspect of the present invention there is provided a controller for a wind turbine comprising: an input adapted to receive one or more wind speed measurements upstream of a wind turbine; a first processor adapted to determine an indication of a current wind speed at the wind turbine wherein the indication includes below rated wind speed or above rated wind speed; a second processor adapted to determine if wind speed is in an up transition region or a down transition region based on the received one or more wind speed measurements and the indication of the current wind speed; and a third processor adapted to initiate a boost action if determined that the wind speed is in the up transition region or the down transition region.

According to a third aspect of the present invention there is provided a controller for a wind turbine adapted to: receive one or more wind speed measurements upstream of a wind turbine; determine an indication of a current wind speed at the wind turbine wherein the indication includes below rated wind speed or above rated wind speed; determine if wind speed is in an up transition region or a down transition region based on the received one or more wind speed measurements and the indication of the current wind speed; and initiate a boost action if determined that the wind speed is in the up transition region or the down transition region.

The first processor may be further adapted to identify a current electrical power output of a generator of the wind turbine; and to determine the indication of the current wind speed based on the current electrical power output of the generator.

The second processor may be further adapted to compare the received wind speed measurement with the indication of the current wind speed; and wherein the wind speed is in the up transition region if the indication of the wind speed at the wind turbine is below rated and the wind speed measurement is above rated wind speed for the wind turbine.

The second processor may be further adapted to determine if two or more consecutive received wind speed measurements are above rated wind speeds for the wind turbine.

The second processor may be further adapted to compare the received wind speed measurement with the indication of the current wind speed; and wherein the wind speed is in the down transition region if the indication of the wind speed at the wind turbine is above rated wind speed for the wind turbine and the wind speed measurement is below rated wind speed for the wind turbine.

The second processor may be further adapted to determine if two or more consecutive received wind speed measurements are below rated wind speeds for the wind turbine.

The third processor may be further adapted to instruct the generator to increase electrical torque if the wind speed is in the up transition region.

The third processor may be further adapted to instruct a pitch control system of the wind turbine to alter a pitch angle of one or more turbine blades if the wind speed is in the down transition region.

The controller may be adapted to perform any or all of the functions and features of the method by hardware, software or any combination thereof.

The first processor, second processor and third processor may be the same processor, different processors or any combination thereof.

According to a fourth aspect of the present invention there is provided a wind turbine comprising a rotor, a generator and a controller according to any of the features and functions of the controller described herein.

According to a fifth aspect of the present invention there is provided a computer program product comprising computer readable executable code for: receiving one or more wind speed measurements upstream of a wind turbine; determining an indication of a current wind speed at the wind turbine wherein the indication includes below rated wind speed or above rated wind speed; determining if wind speed is in an up transition region or a down transition region based on the received one or more wind speed measurements and the indication of the current wind speed; and initiating a boost action if determined that the wind speed is in the up transition region or the down transition region.

The computer program product may further comprise computer readable executable code for implementing any of all of the functions and/or features of the present invention.

Embodiments will now be described, by way of example only, with reference to the accompanying drawings, in which.

Figure 1:
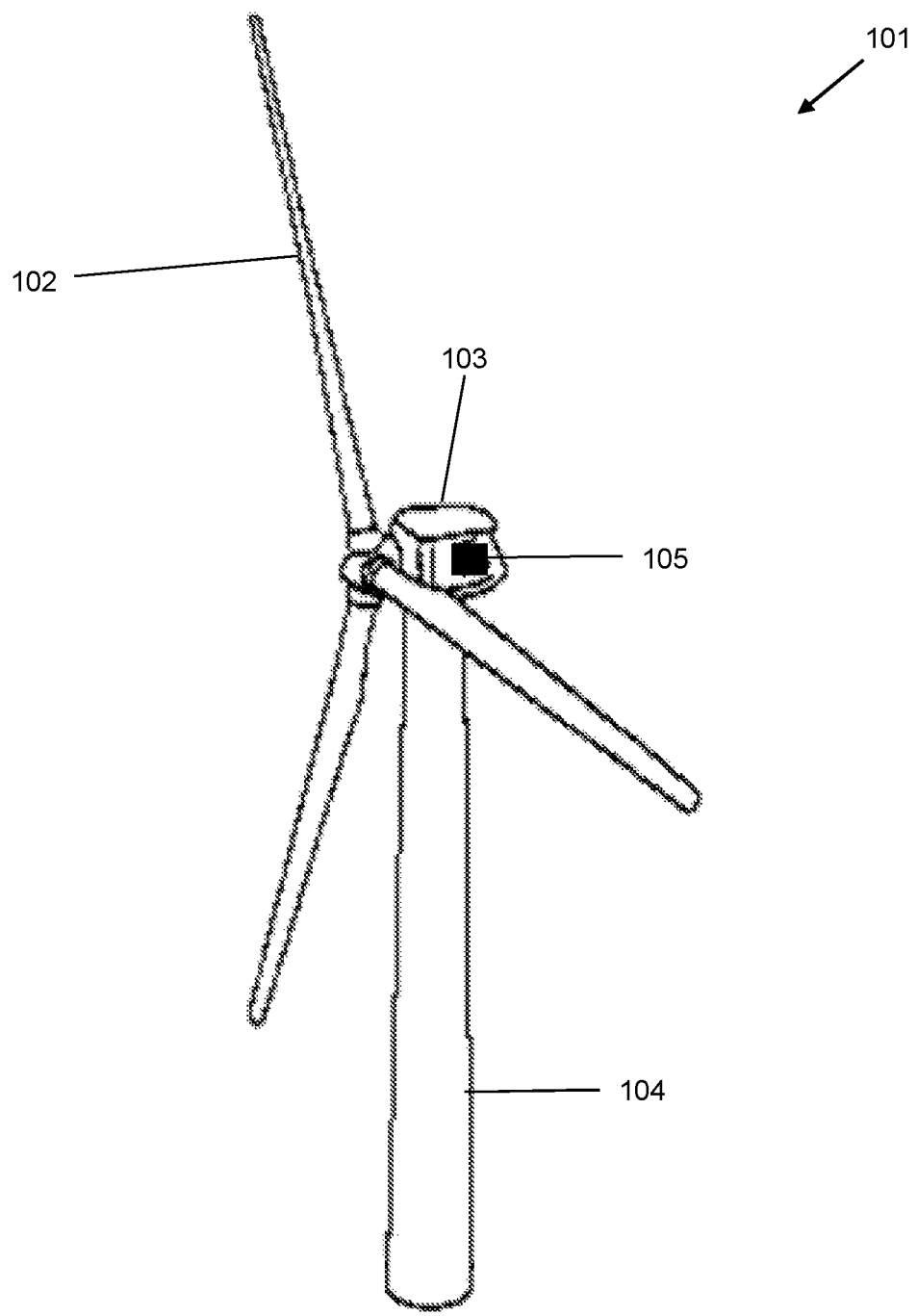
FIG. 1 shows a simplified schematic diagram of a wind turbine according to many of the embodiments of the present invention.

With reference to FIG. 1, a wind turbine 101 typically comprises turbine blades 102 coupled to a nacelle 103, which in turn is typically mounted on a tower 104.

In FIG. 1, three turbine blades 102 are shown however, as will be appreciated, the number of turbine blades 102 is dependent on the design of the wind turbine and may include one or more turbine blades 102.

Also, FIG. 1 shows a horizontal axis turbine blade arrangement however, as will be appreciated, the wind turbine may alternatively or additionally include a vertical axis turbine blade arrangement.

Typically, the nacelle 103 will house the wind turbine's 101 electrical generator, gearbox, drive shafts, and other electrical and mechanical equipment, such as a pitch control system, a yaw control system and so on, (not shown in FIG. 1 for ease of reference).

In order to determine the wind speed and direction of the wind, the wind turbine may include one or more sensors, for example, anemometer sensor, ultra-sonic sensor, a Light Detection and Ranging (LiDAR) device, and so on, either located on the nacelle 103, in a hub, on/in turbine blades, etc.

The wind turbine may also include one or more controllers 105 to control the operation of the wind turbine 101.

The blades 102 of the wind turbine 101 start to rotate to generate electrical power at wind speeds of around 3 or 4 m/s which is known in the art as the wind cut-in speed. As the wind speed increases the wind turbine 101 generates more electrical power until the wind turbine generates the maximum permissible electrical power output from the generator in the wind turbine 101. This typically occurs between 10 m/s and 12 m/s (depending on the design of the wind turbine) and is known in the art as the rated wind speed.

At wind speeds above the rated wind speed the electrical power output is effectively independent of the wind speed as the electrical power output is regulated to be substantially constant at the maximum permissible electrical power output of the generator.

However, in the region around the rated wind speed point energy capture (e.g. electrical power generated) can vary as the wind speed goes from below rated to above rated speeds and vice-versa from above rated to below rated wind speeds. This leads to an inefficient operation of the wind turbine 101 as potential energy capture/electrical power production is lost in this region.

Figure 2:
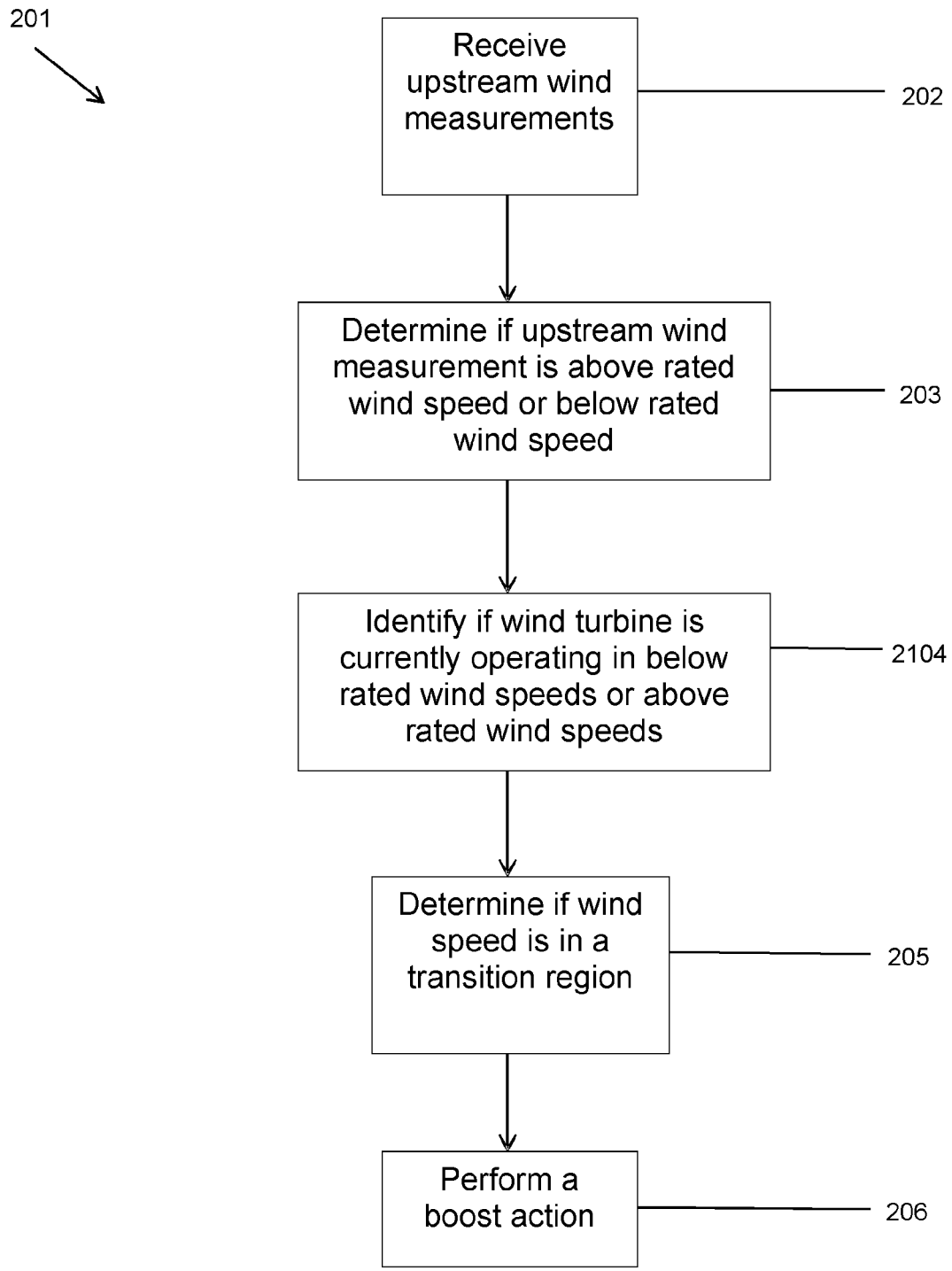
FIG. 2 shows a flow chart according to many of the embodiments of the present invention.

With reference to FIG. 2 which shows a flowchart 201, an example will be described which improves the energy capture of the wind turbine and enables the wind turbine to be controlled more efficiently such that the maximum power output is achieved faster than with existing wind turbines.

This first example relates to the situation where the wind turbine transitions from below rated wind speed to above rated wind speed. In other words, the wind speed is in an up transition region in that the wind speed is transitioning up from below rated wind speeds to rated or above rated wind speeds. In the following description the term above rated wind speed also includes the rated wind speed and any wind speed greater than the rated wind speed.

In step 202, a measurement of the wind speed upstream of the wind turbine is received by the controller in the wind turbine.

The wind turbine may include one or more sensors to measure or detect wind speed at a predefined distance or a predefined time period upstream of a wind turbine. Alternatively, the sensors may be located on another wind turbine and the measurements shared, on a separate gantry or mounting platform, located at or attached to any other device or equipment such that it can measure or detect wind speed at a predetermined distance or time period upstream of the wind turbine and provide the wind speed measurement to the controller in the wind turbine.

The sensors may be, for example, one or more of a Light Detecting and Ranging (LiDAR) sensor, an anemometer sensor, an ultra-sonic sensor, or any other sensor that can measure or detect wind speed upstream of the wind turbine.

The controller may receive the wind speeds measurements automatically or may request the wind speed measurements from the sensor.

In this example, the wind turbine includes a LiDAR device attached to the nacelle of the wind turbine which measures the wind speed 100 meters upstream at a frequency of 2 Hz and provides the wind speed measurements automatically to the controller in the wind turbine.

In step 203, the controller determines or identifies whether the received measured wind speed is above or below rated wind speed. The rated wind speed for wind turbines may vary depending on the design of the wind turbine, but in this example, the rated wind speed is 10.7 meters per second (m/s).

In step 204, the controller identifies whether the wind turbine is currently operating above or below rated wind speed. For example, the controller may identify whether the wind turbine is currently operating above or below rated wind speed based on the electrical power currently being generated by the generator in the wind turbine.

As described hereinabove, at below rated wind speed the electrical output of the generator is below the maximum permissible electrical output as the wind speed is not large enough to produce the maximum permissible electrical output of the generator. At wind speeds above the rated wind speed the electrical power output is effectively independent of the wind speed as the electrical power output is regulated to be substantially constant at the maximum permissible electrical power output of the generator.

Therefore, the controller can identify whether the wind turbine is currently operating above or below rated wind speed based on the current electrical power output of the generator.

In step 205, the controller identifies, based on the received wind speed measurement and the current electrical power output, whether the wind speed is transitioning from below rated to above rated (an up transition region) or from above rated to below rated (a down transition region). The controller will also be able to identify whether the wind speed is staying above rated or staying below rated but the transitions have been identified as regions where an improved control of the wind turbine is able capture additional energy and improve the efficiency of the wind turbine.

This example relates to the transition of the wind speed from below rated wind speed to above rated wind speed (the up transition region) and accordingly, the controller identifies that the wind speed will be transitioning from below rated to above rated.

Once the controller identifies that the wind speed will transition from below rated to above rated then, in step 206, the controller performs a boost action so that the wind turbine can capture more energy (and therefore generate more electrical power) than current wind turbines.

In this example, the region of interest is where the wind speed transitions from below rated to above rated and therefore to effectively boost the energy capture, e.g. increase the electrical power generated, the controller initiates a process to slow the rotation speed of the rotor. Once the measured above rated wind speed reaches the wind turbine, the increased wind speed accelerates the rotor back to the correct speed. The correct speed for a rotor for a given wind turbine is dependent on the design of the wind turbine and is generally the optimal rotor speed or the designed rotor speed to produce the optimal amount of electrical power for the wind turbine from the wind conditions. In this example, the correct rotor speed for the wind turbine will be 13 revolutions per minute (rpm).

The controller may initiate the boost action in this case by increasing the generator electrical torque which has the effect of taking kinetic energy out of the rotor slowing the rotation speed of the rotor. In wind turbines, a variable electrical torque signal can be applied or provided which alters the generator electrical torque. For example, the controller may provide a particular power demand to a converter where the converter generates a torque demand or torque signal which is provided to the generator. In this example, the controller may initiate an increase in the electrical torque of the generator which subsequently slows the rotor speed by 10%. Therefore, as the optimal rotor speed in this example is 13 rpm then the rotor speed is slowed to 11.7 rpm. As will be appreciated, the rotor speed may be slowed by any suitable percentage or amount to be able to advantageously increase the electrical power output according to many of the embodiments of the present invention.

Additionally or alternatively, the controller may determine the amount to increase the electrical torque based on the measured wind speed upstream of the wind turbine to enable the rotor speed to return to the correct speed for the wind turbine within a predefined time period, for example, within 10 seconds of the wind speed measured upstream impacting the wind turbine. The controller may calculate the increase of the electrical torque or may refer to a lookup table to determine the increase of the electrical torque dependent on the measured wind speed upstream.

Based on the received torque demand or torque signal then the electrical generator may increase the electrical torque thereby slowing the rotational speed of the rotor by the required amount.

The controller may initiate other mechanisms for slowing the rotor speed in order to initiate the required boost in the region where the wind speed transitions from below rated wind speed to above rated wind speed.

Accordingly, this example advantageously effectively shifts electrical power production from the above rated wind speed region to the below rated wind speed region thereby increasing the electrical power generated and the efficiency of the wind turbine. Effectively, this example utilizes the kinetic energy in the rotor to increase the electrical power output of the generator in the up transition region.

Figure 3A:
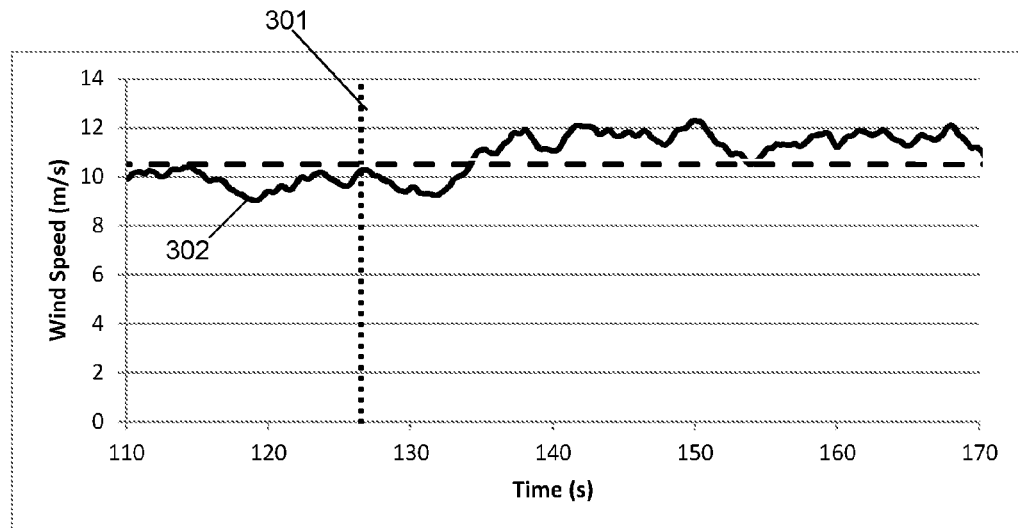
FIG. 3 shows three graphs according to many of the embodiments of the present invention.
Figure 3B:
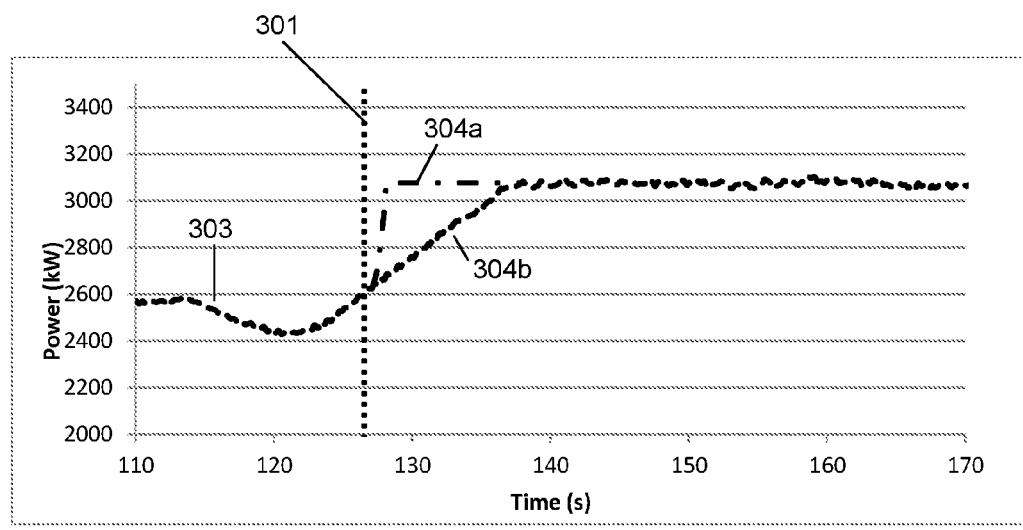
Figure 3C:
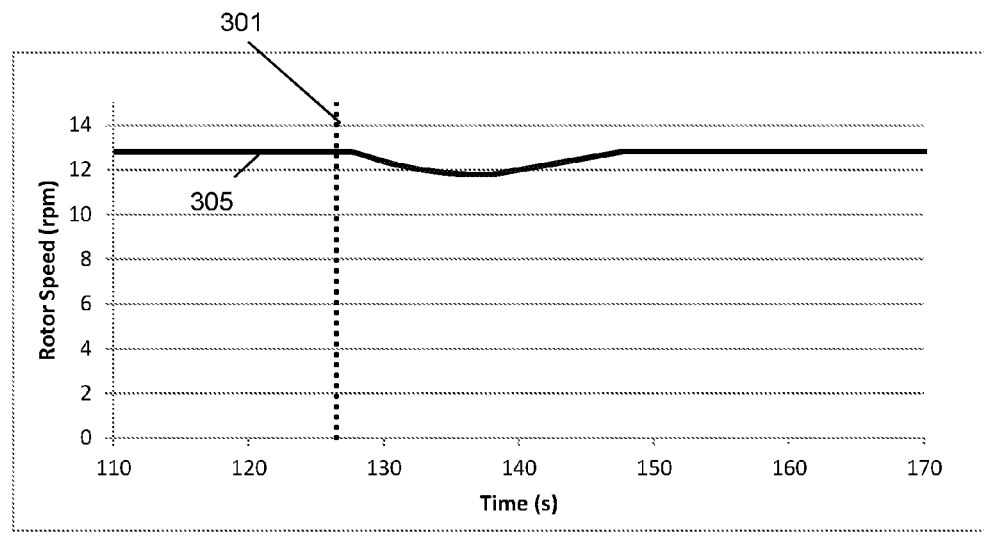

The advantages of the boost action in this example are highlighted in FIG. 3. FIG. 3 includes three plots, FIG. 3a shows the wind speed vs time, FIG. 3b shows power generated vs time and FIG. 3c shows rotor speed vs time.

In FIG. 3a, it can be seen that at a point in time 301 (in this plot at 126 seconds) the LiDAR detects or measures that the wind speed 100 m upstream of the turbine will be 10.7 m/s which, in this example, is the rated wind speed. Therefore, at 136 seconds in the plot the wind speed will reach rated wind speed.

The controller also identifies from the current power output that at 126 seconds the wind speed is below rated as the electrical power output will be below substantially the maximum power output of the generator.

Therefore, at 126 seconds the controller initiates a boost action 301, which in this example is to initiate an increase electrical torque in the generator such that the rotational speed of the rotor is reduced.

Turning now to FIG. 3b, as can be seen at 126 seconds 301 the electrical power output 303 is below the maximum electrical power output for the generator as the wind speed is below rated wind speed. At this point in time the controller initiates the boost which causes the rotor speed to slow down and the electrical power output from the generator increases 304a. As can be seen from FIG. 3b, the maximum electrical power output from the generator 304a is reached significantly quicker than existing wind turbines shown as 304b in FIG. 3b which do not employ such a boost action of this example. In effect the additional electrical power generated during the up transition region from below rated to above rated wind speeds is achieved in this example from converting the kinetic energy of the rotor into electrical power by slowing the rotor which is then compensated for when the wind speed goes to the rated wind speed or above.

At 136 seconds the rated wind speed reaches the wind turbine which has the effect of speeding up the rotor back to its correct speed to maintain the maximum electrical power output from the generator.

FIG. 3b shows the significant advantage of the boost action of the embodiments and shows the shift in electrical power generation from above rated to below rated wind speeds.

FIG. 3c shows the rotor speed 305 of the blades and as can be seen the rotor speed is 13 rpm in this example prior to the boost action at 126 seconds. Once the boost action is initiated by the controller the rotor speed is slowed or reduced by 10% to 11.7 rpm. Once the above rated wind speed arrives at the wind turbine at 136 seconds in this example, the increase in wind speed accelerates the rotor until the rotor reaches or returns to the correct rotor speed, which in this example is 13 rpm.

The above example describes the case where the controller identifies that the wind speed will transition from below rated to above rated (the up transition region) and initiates a boost action to increase the electrical power generated and improve the efficiency of the wind turbine.

In the following example, explained again with reference to FIG. 2, the region of interest is where the wind speed transitions from above rated to below rated. In other words, the wind speed is in a down transition region in that the wind speed is transitioning down from above rated wind speeds to below rated wind speeds.

In this example, the process follows the same steps 202 to 204 in the flowchart 201 shown in FIG. 2 and described hereinabove in relation to the first example and so will not be duplicated.

However, in this example, in step 205 the controller identifies, based on the received wind speed measurement and the current electrical power output, that the wind speed is transitioning from above rated to below rated wind speeds for the wind turbine.

Once the controller identifies that the wind speed will transition from above rated to below rated (and therefore be in a down transition region) then, in step 206, the controller performs a boost action so that the wind turbine can capture more energy (and therefore generate more electrical power) than current wind turbines.

In this example, the region of interest is where the wind speed transitions from above rated to below rated and therefore to effectively boost the energy capture, e.g. increase the electrical power generated, the controller initiates a process to speed up the rotation speed of the rotor as the boost action. Once the measured below rated wind speed reaches the wind turbine, the decreased wind speed slows the rotor back to the correct speed which as discussed above is 13 rpm in this example but is dependent on the design of the wind turbine.

The controller may initiate the boost by, for example, initiating a change in pitch of the turbine blades such that the rotational speed of the rotor to which the blades are attached increases. In this example, the controller may initiate a pitch angle change of approximately 1.6 degrees such that the rotor speed increases by approximately 8%. As will be appreciated, the amount of change in the pitch angle and the increase in the rotor speed may be any suitable values for the purpose of the invention in order to generate more electrical power output in the down transition region.

The controller may initiate other mechanisms, for example, using flaps or any other aerodynamic component, for increasing the rotor speed in order to initiate the required boost in the region where the wind speed transitions from above rated to below rated.

Accordingly, this example advantageously extends the region in which substantially the maximum electrical power production can be achieved. The boost effectively enables substantially maximum electrical power production from the below rated wind speed region thereby increasing the electrical power generated and the efficiency of the wind turbine. As such, the electrical power output is again effectively shifted from above rated wind speeds to below rated wind speeds.

The advantages of the boost action in this example are highlighted in FIG. 4. FIG. 4 includes four plots, FIG. 4a shows the wind speed vs time, FIG. 4b shows the pitch angle change vs. time, FIG. 4c shows rotor speed vs. time, and FIG. 4d shows power generated vs. time.

Figure 4A:
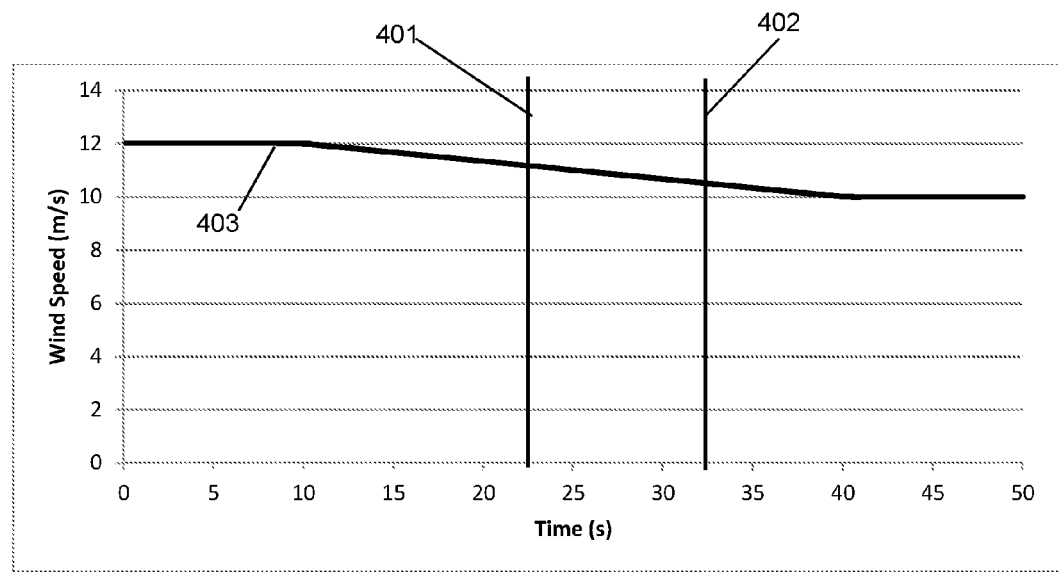
FIG. 4 shows four graphs according to many of the embodiments of the present invention.

In FIG. 4a, which shows wind speed 403 against time, it can be seen that at a point in time (in this plot at 23 seconds)

the LiDAR or similar device detects or measures that the wind speed 100 m upstream of the wind turbine will drop below rated wind speed (which in this example is 10.7 m/s). Therefore, by 33 seconds on the plot 402 the below rated wind speed will reach the wind turbine.

Figure 4B:
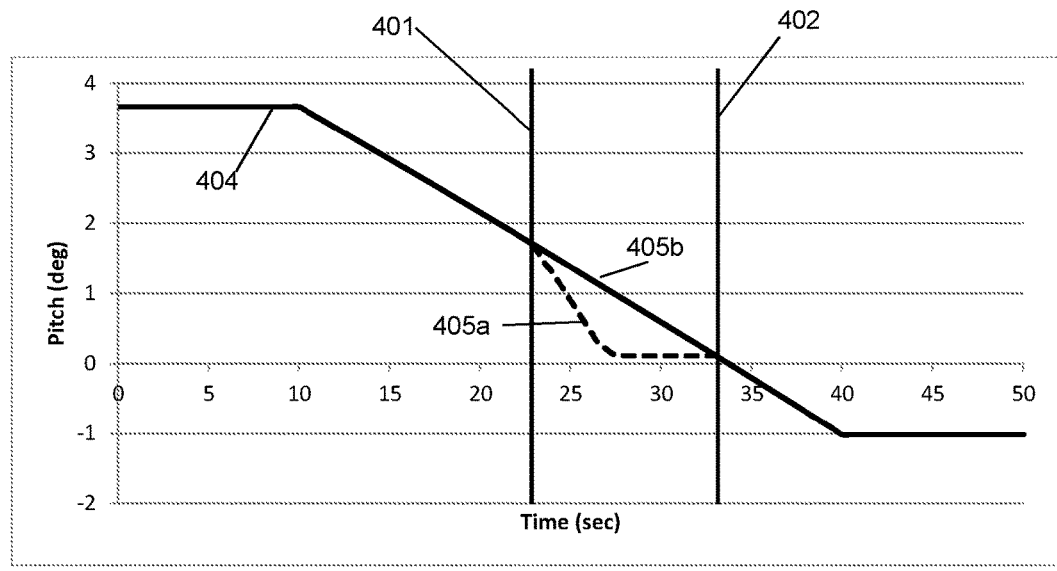
Figure 4C:
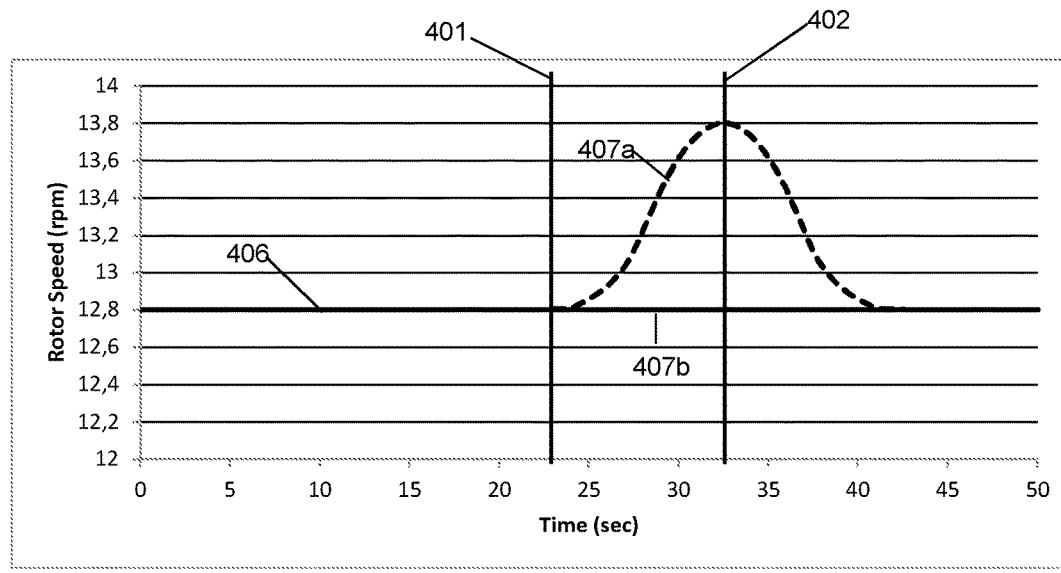
Figure 4D:
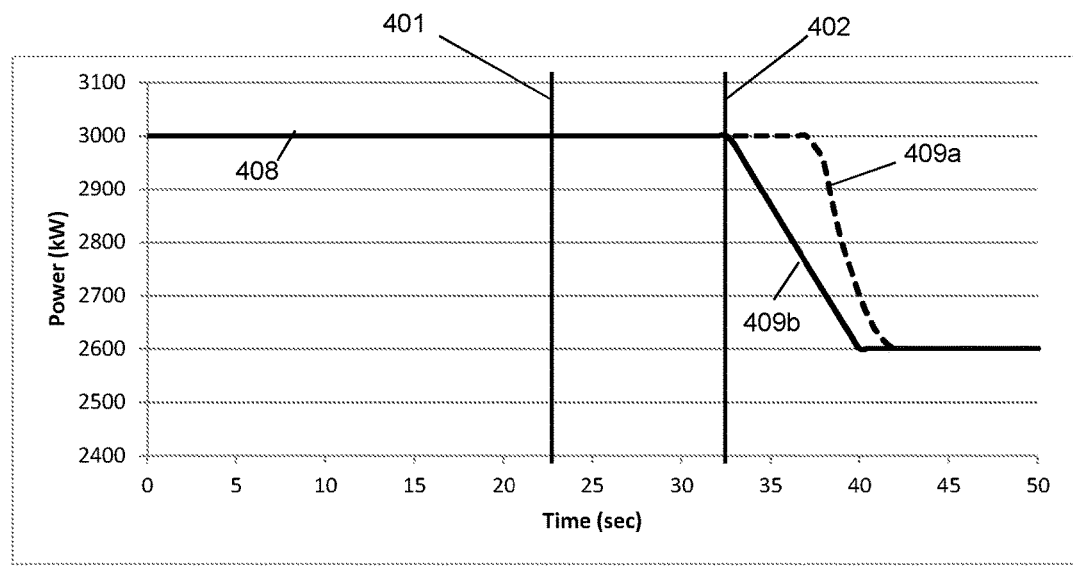

The controller also identifies from the current electrical power output that the wind turbine is currently operating at rated wind speed as it is generating the maximum permissible electrical power (which can be seen from FIG. 4*d*). Accordingly, the controller determines or identifies that the wind turbine will shortly be in a down transition, in other words, the wind speed is transitioning from above rated to below rated wind speeds.

Therefore at 23 seconds in the plots of FIG. 4, the controller initiates a boost action 401 which, in this example, is to initiate a change in pitch angle such that the speed of the rotor is increased (as can be seen from FIGS. 4*b* and 4*c*).

Turning to FIG. 4*b*, it can be seen that at 23 seconds when the boost action is initiated 401 by the controller the pitch angle 404 is changed or altered by approximately 1.6 degrees 405*a* such that the rotor will speed up. The pitch angle is altered so as to extract more energy from the wind whilst (as can be seen from FIG. 4*d*) the same maximum permissible electrical power production is maintained when the rotor speed increases. Conventional wind turbines follow 405*b* during the down transition period.

FIG. 4*c* shows the rotor speed prior to the boost action 406 and subsequent to the boost action being initiated 401 at 23 seconds. As can be seen in the plot, once the boost is initiated the rotor speed increases 407*a* whilst conventional wind turbines follow 407*b* during the down transition period.

FIG. 4*d* prior to the boost action at 401 the electrical power generated 408 is at the maximum permissible prior to the boost action. Once the boost action has been initiated the electrical power output remains at the maximum permissible as the below rated wind speed has not yet reached the wind turbine. At 33 seconds in the plot the below rated wind speed reaches the wind turbine and in this example, the electrical power generated 409*a* remains at the maximum permissible for a period of time after the below rated wind speed reaches the wind turbine whilst in conventional wind turbines the electrical power generated 409*b* drops off significantly as soon as the below rated wind speed reaches the wind turbine.

Accordingly in this example, the electrical power produced is greater than the power extracted from the wind energy due to accelerating the rotor prior to the below rated wind speeds reaching the wind turbine. Effectively, kinetic energy stored in the rotor is used to generate additional electrical power once the wind speed falls below rated wind speeds.

In the above example, the wind speed upstream of the wind turbine is measured at a frequency of 2 Hz, e.g. a measurement every half a second and is therefore substantially continuously. As will be appreciated, the frequency of taking the measurements of the wind speed could be any frequency suitable for the purpose of the invention, e.g. every 1 second, every 2 seconds, every 5 seconds, and so on.

In the above described examples, the wind speed was measured or detected 100 meters upstream of the wind turbine. Typically, the rated wind speed for wind turbines is approximately 10 m/s to 12 m/s and therefore at 100 meters it would take approximately 10 seconds for the measured wind speed in the region of the rated wind speed to reach the wind turbine. In other words, if the wind speed is transitioning from below rated to above rated or from above rated to below rated then the wind speed will be close to the rated wind speed and as such will take around 10 seconds to reach the turbine, which is sufficient time to initiate the appropriate boost action depending on the transition that will occur. However, as will be appreciated, the wind speed may be measured or detected 50 meters, 100 meters, 150 meters, 200 meters, and so on upstream of the wind turbine.

In the above examples, a single wind speed measurement is taken 100 meters upstream of the wind turbine and the determination of whether to initiate a boost action is based on the single measurement.

Additionally, the system may take more than one wind speed measurement and the determination of whether to whether to initiate a boost action may be based on the multiple wind speed measurements. For example, in the above examples a wind speed measurement is taken every half a second and the determination as to whether a boost action is to be initiated may be based on, for example, 3 subsequent wind speed measurements. In the example of the wind speed transitioning from below rated to above rated, the decision to initiate a boost action may be made if the three subsequent wind speed measurements are all above rated wind speeds. Similarly, in the example of the wind speed transitioning from above rated to below rated, the decision to initiate a boost action may be made if the three subsequent wind speed measurements are all below rated wind speeds.

As will be appreciated, the determination as to whether to initiate a boost action may be based on any number of wind measurements.

Alternatively, or additionally, the wind speed at multiple distances may be measured, for example, the wind speed at 100 meters, at 150 meters and at 200 meters upstream of the wind turbine. The determination as to whether to initiate a boost action may be based on the measured wind speeds at the multiple distances. For example, if the wind speed is transitioning from below rated to above rated, the decision to initiate a boost action may be made if the wind speed measurements at all or a majority of the distances are above rated wind speeds.

Similarly, if the wind speed is transitioning from above rated to below rated, the decision to initiate a boost action may be made if the wind speed measurements at all or a majority of the distances are below rated wind speeds. As will be appreciated, the distances at which multiple measurements of the wind speed are taken may be any distances suitable for the purpose of the invention.

In the above examples, the current wind speed at the wind turbine is indicated or inferred from the electrical power output of the generator. However, the current wind speed at the wind turbine may be determined based on wind speed measurements taken at, or substantially close to, the wind turbine. The current wind speed may be determined based on the measured wind speeds upstream of the wind turbine and inferred or interpolated from those measurements. As will be appreciated, the wind speed at the wind turbine can be determined from several different methods and any method suitable for the invention.

Accordingly, the above embodiments of the present invention enable an improved control of a wind turbine to more efficiently and effectively capture of energy from the wind. In effect, the region in which substantially maximum electrical power is generated by the wind turbine is advantageously extended by performing the boost actions in the transition regions around the rated wind speed.

While embodiments of the present invention have been shown and described, it will be understood that such embodiments are described by way of example only.

Numerous variations, changes and substitutions will occur to those skilled in the art without departing from the scope of the present invention as defined by the appended claims. Accordingly, it is intended that the following claims cover all such variations or equivalents as fall within the spirit and scope of the invention.

What is claimed is:

1. A method comprising:
    receiving one or more wind speed measurements of a first wind speed measured at a location upstream of a wind turbine;
    determining a first indication of the first wind speed, wherein the first indication indicates whether the first wind speed is below or above a rated wind speed of the wind turbine;
    determining a second indication of a second wind speed at the wind turbine, wherein the second indication indicates that the second wind speed is below the rated wind speed of the wind turbine;
    determining whether the wind turbine is an up transition region,
        wherein the wind turbine is determined to be in the up transition region in response to the first indication indicating that the first wind speed is above the rated wind speed and the second indication indicating that the second wind speed is below the rated wind speed; and
    initiating a boost action upon determining that the wind turbine is in the up transition region such that a rotor of the wind turbine is slowed from a first rotational speed to a second rotational speed to convert rotational kinetic energy stored in the rotor to electrical energy to thereby output electrical power at a maximum rated power for the wind turbine before the wind turbine experiences wind of the first wind speed determined by the first indication.

2. The method as claimed in claim 1, wherein determining the second indication of the second wind speed further comprises:
    identifying a current electrical power output of a generator of the wind turbine; and
    determining the second indication of the second wind speed based on the current electrical power output of the generator.

3. The method as claimed in claim 1, wherein determining whether the wind turbine is in one of an up transition region, a down transition region, or not in a transition region further comprises:
    comparing the received one or more wind speed measurements with the second indication of the second wind speed.

4. The method as claimed in claim 3, wherein determining whether the wind turbine is in one of an up transition region, a down transition region, or not in a transition region further comprises:
    determining whether two or more consecutive wind speed measurements of the one or more received wind speed measurements are above the rated wind speed for the wind turbine.

5. The method as claimed in claim 1, wherein determining whether the wind turbine is in one of an up transition region, a down transition region, or not in a transition region further comprises:
    comparing the received one or more wind speed measurements with the second indication of the second wind speed.

6. The method as claimed in claim 5, wherein determining whether the wind turbine is in one of an up transition region, a down transition region, or not in a transition region further comprises:
    determining whether two or more consecutive wind speed measurements of the one or more received wind speed measurements are below the rated wind speed for the wind turbine.

7. The method as claimed in claim 1, wherein initiating the boost action further comprises:
    instructing a generator of the wind turbine to increase electrical torque in response to determining that the wind turbine is in the up transition region.

8. The method of claim 1, wherein the first indication further indicates a time when the wind turbine is expected to experience the wind of the first wind speed.

9. The method of claim 1, wherein the wind of the first wind speed causes the rotor to return to the first rotational speed from the second rotational speed and the wind turbine outputs electrical power of the maximum rated power while the rotor returns to the first rotational speed.

10. The method of claim 1, wherein the rated wind speed corresponds to a speed that the wind turbine is rated to produce the maximum rated power without performing the boost action.

11. A controller for a wind turbine comprising:
    an input configured to receive one or more wind speed measurements of a first wind speed measured at a location upstream of a wind turbine and provide a first indication of whether the first wind speed is above or below a rated wind speed of the wind turbine;
    a first processor configured to determine a second indication of a second wind speed at the wind turbine, wherein the second indication indicates that the second wind speed is above the rated wind speed of the wind turbine;
    a second processor adapted to determine whether the wind turbine is in a down transition region
        in response to the first indication indicating that the first wind speed is below the rated wind speed and the second indication indicating that the second wind speed is above the rated wind speed; and
    a third processor configured to initiate a boost action upon determining that the wind turbine is the down transition region such that a rotor of the wind turbine is sped up from a first rotational speed to a second rotational speed to store additional rotational kinetic energy in the rotor before the wind turbine experiences wind of the first wind speed to thereby output electrical power of a maximum rated power for the wind turbine when the wind turbine experiences the wind of the first wind speed.

12. The controller as claimed in claim 11, wherein the first processor is further configured to identify a current electrical power output of a generator of the wind turbine; and to determine the second indication of the second wind speed based on the current electrical power output of the generator.

13. The controller as claimed in claim 11, wherein the second processor is further configured to compare the one or more received wind speed measurements with the second indication of the second wind speed.

14. The controller as claimed in claim 13, wherein the second processor is further configured to determine whether two or more consecutive wind speed measurements of the one or more received wind speed measurements are above the rated wind speed for the wind turbine.

15. The controller as claimed in claim 14, wherein the second processor is further configured to prevent the third processor from initiating the boost action until the two or more consecutive wind speed measurements are above the rated wind speed for the wind turbine.

16. The controller as claimed in claim 13, wherein the second processor is further configured to determine if two or more consecutive wind speed measurements of the one or more received wind speed measurements are below the rated wind speed for the wind turbine.

17. The controller as claimed in claim 11, wherein the third processor is further configured to instruct a pitch control system of the wind turbine to alter a pitch angle of one or more turbine blades in response to determining that the wind turbine is in the down transition region.

18. A wind turbine comprising a rotor, a generator, and a controller according to claim 11.

19. A method comprising:
 determining that a wind turbine is in an up transition region when:
  a first wind speed experienced by the wind turbine is below a rated wind speed of the wind turbine at which an output power of the wind turbine is below a maximum rated power; and
  a second wind speed, measured at a location upstream from the wind turbine, is at or above the rated wind speed; and
 instructing a generator of the wind turbine to perform a boost action in response to determining that the wind turbine is in the up transition region such that the output power of the wind turbine is the maximum rated power of the wind turbine, which results in the rotor slowing from a first rotational speed to a second rotational speed before wind of the second wind speed reaches the wind turbine, and
 increasing the rotor speed when the wind turbine experiences wind of the second wind speed, such that the rotor returns to the first rotational speed while the wind turbine outputs the maximum rated power with the boost action active.

\* \* \* \* \*